United States Patent
Sonobe (10) Patent No.: US 7,830,401 B2
(45) Date of Patent: Nov. 9, 2010

(54) INFORMATION PROCESSING APPARATUS

(75) Inventor: Hajime Sonobe, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 12/240,576

(22) Filed: Sep. 29, 2008

(65) Prior Publication Data

US 2009/0160883 A1     Jun. 25, 2009

(30) Foreign Application Priority Data

Dec. 21, 2007   (JP)   ............... 2007-330178

(51) Int. Cl.
G06F 3/038 (2006.01)
G09G 5/00 (2006.01)
G09G 5/02 (2006.01)
G06K 15/00 (2006.01)
H04N 1/405 (2006.01)

(52) U.S. Cl. ................ 345/699; 358/3.1; 358/3.12

(58) Field of Classification Search ........... 345/204, 345/698, 699; 358/3.1, 3.12
See application file for complete search history.

(56) References Cited

U.S. PATENT DOCUMENTS

| | | | | |
|---|---|---|---|---|
| 6,839,903 | B1 * | 1/2005 | Shintani et al. | 725/39 |
| 7,158,094 | B2 * | 1/2007 | Wilks | 345/1.1 |
| 2005/0046725 | A1 | 3/2005 | Sasagawa | |
| 2005/0068346 | A1 | 3/2005 | Ogawa et al. | |
| 2005/0259094 | A1 * | 11/2005 | Liu et al. | 345/204 |
| 2006/0132473 | A1 * | 6/2006 | Fuller et al. | 345/204 |

FOREIGN PATENT DOCUMENTS

| | | |
|---|---|---|
| JP | 11-095732 | 4/1999 |
| JP | 2000-47647 | 2/2000 |
| JP | 2000-066649 | 3/2000 |
| JP | 2001-016545 | 1/2001 |
| JP | 2001-356752 | 12/2001 |
| JP | 2003-150369 | 5/2003 |
| JP | 2005-73164 | 3/2005 |
| JP | 2005-109703 | 4/2005 |
| JP | 2005-242074 | 9/2005 |
| JP | 2006-166268 | 6/2006 |
| JP | 2006-340203 | 12/2006 |
| JP | 2007-088933 | 4/2007 |
| JP | 2007-212578 | 8/2007 |

OTHER PUBLICATIONS

An English Translation of Notice of Reasons for Rejection issued by the Japan Patent Office on Dec. 24, 2008.

* cited by examiner

*Primary Examiner*—Alexander S Beck
(74) *Attorney, Agent, or Firm*—Knobbe, Martens, Olson & Bear LLP (57) ABSTRACT

According to one embodiment, an information processing apparatus includes an internal display device that displays image information; an output terminal connectable with at least one external display device or more; and a display adjustment section that changes resolutions of the internal display device and the external display device to a display resolution based on comparison between the resolutions of the internal display device and the external display device and further adjust, when an aspect ratio of the internal display device differs from an aspect ratio of the external display device, display timing of the internal display device whose resolution has been changed and display timing of the external display device whose resolution has been changed, based on information about differences among the aspect ratios.

3 Claims, 10 Drawing Sheets

INTERNAL DISPLAY DEVICE
(4:3)

FIG. 9B

EXTERNAL DISPLAY DEVICE
(16:10)

FIG. 9C

INTERNAL DISPLAY DEVICE
(16:10)

FIG. 9D

EXTERNAL DISPLAY DEVICE
(4:3)

FIG. 10A

INTERNAL DISPLAY DEVICE
(4:3)

FIG. 10B

EXTERNAL DISPLAY DEVICE
(16:10)

FIG. 10C

INTERNAL DISPLAY DEVICE
(16:10)

FIG. 10D

EXTERNAL DISPLAY DEVICE
(4:3)

INFORMATION PROCESSING APPARATUS

CROSS-REFERENCE TO RELATED APPLICATIONS

This application is based upon and claims the benefit of priority from Japanese Patent Application No. 2007-330178, filed on Dec. 21, 2007, the entire contents of which are incorporated herein by reference.

BACKGROUND

1. Field

The present invention relates to an information processing apparatus, and more particularly to an information processing apparatus that simultaneously outputs single video/image information to a plurality of display devices.

2. Description of the Related Art

Various notebook personal computers and laptop computers have recently been developed. The personal computer is equipped with a flat-panel display, such as a Liquid-crystal Display (LCD), as an internal display device. The personal computer is equipped with a connector to which an external display device having a Cathode-ray Tube (CRT) or an LCD is connected as necessary, and video/image information, such as a motion picture, is output to the thus-connected external display device as to an internal display device.

In order to display appropriate video/image information on the external display device, the personal computer acquires Extended Display Identification Data (EDID) information from the external display device. The EDID information includes information about the type of a signal that the external display device can process, information about the resolution of a display, and information such as a horizontal effective period and a vertical effective period.

An image output device, such as a personal computer, capable of appropriately setting display conditions for an external display device when connected to the external display device has hitherto been disclosed (see JP-A-2005-109703, for instance). The image output device can convert image information to most appropriate image information by reference to EDID information and output the thus-converted information to the connected external display device.

Some of information processing apparatus, such as personal computers, have internal display devices and a clone display function of simultaneously outputting video/image information identical with video/image information displayed on the internal display device to an external display device connected to the information processing apparatus by a connector.

Of the display devices, some display devices are configured in such a way that an aspect ratio assumes; for example, a ratio of 16:10 or a ratio of 4:3. In such a case, video/image information to be originally displayed in the same manner on both the internal display device and the external display device cannot be displayed appropriately. For instance, when the internal display device has an aspect ratio of 4:3 and the external display device has an aspect ratio of 16:10, video/image information having an appropriate dot aspect ratio of 1:1 is displayed on the internal display device. However, since the external display device is affected by the aspect ratio of the internal display device, a vertically-oriented image whose dot aspect ratio is laterally extended 1.2 times to a ratio of 1.2:1 is displayed on the external display device.

The related-art image output device described in JP-A-2005-109703 can optimally convert image information to be output to a single external display device and can output the thus-converted image information. However, an image output device that provides an optimum clone of a display on both the internal display device and the external display device has not been described.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus has an internal display device that displays video/image information and an output terminal connectable with at least one external display device or more, the apparatus includes: a display condition information acquisition section configured to acquire display condition information including a resolution and an aspect ratio of the internal display device and a resolution and an aspect ratio of the external display device; a resolution comparison section configured to compare the resolutions of the internal display device and the external display device to acquire a display resolution at which the video/image information is displayed; an aspect ratio comparison section configured to compare the aspect ratios of the internal display device and the external display device to acquire information about differences among the aspect ratios; and a display adjustment section configured to change the resolutions of the internal display device and the external display device to the display resolution based on the display resolution and further adjust, when the aspect ratio of the internal display device differs from the aspect ratio of the external display device, display timing of the internal display device whose resolution has been changed and display timing of the external display device whose resolution has been changed, based on the information about the differences among the aspect ratios.

An embodiment of an information processing apparatus of the present invention will be described by reference to the accompanying drawings.

Figure 1:
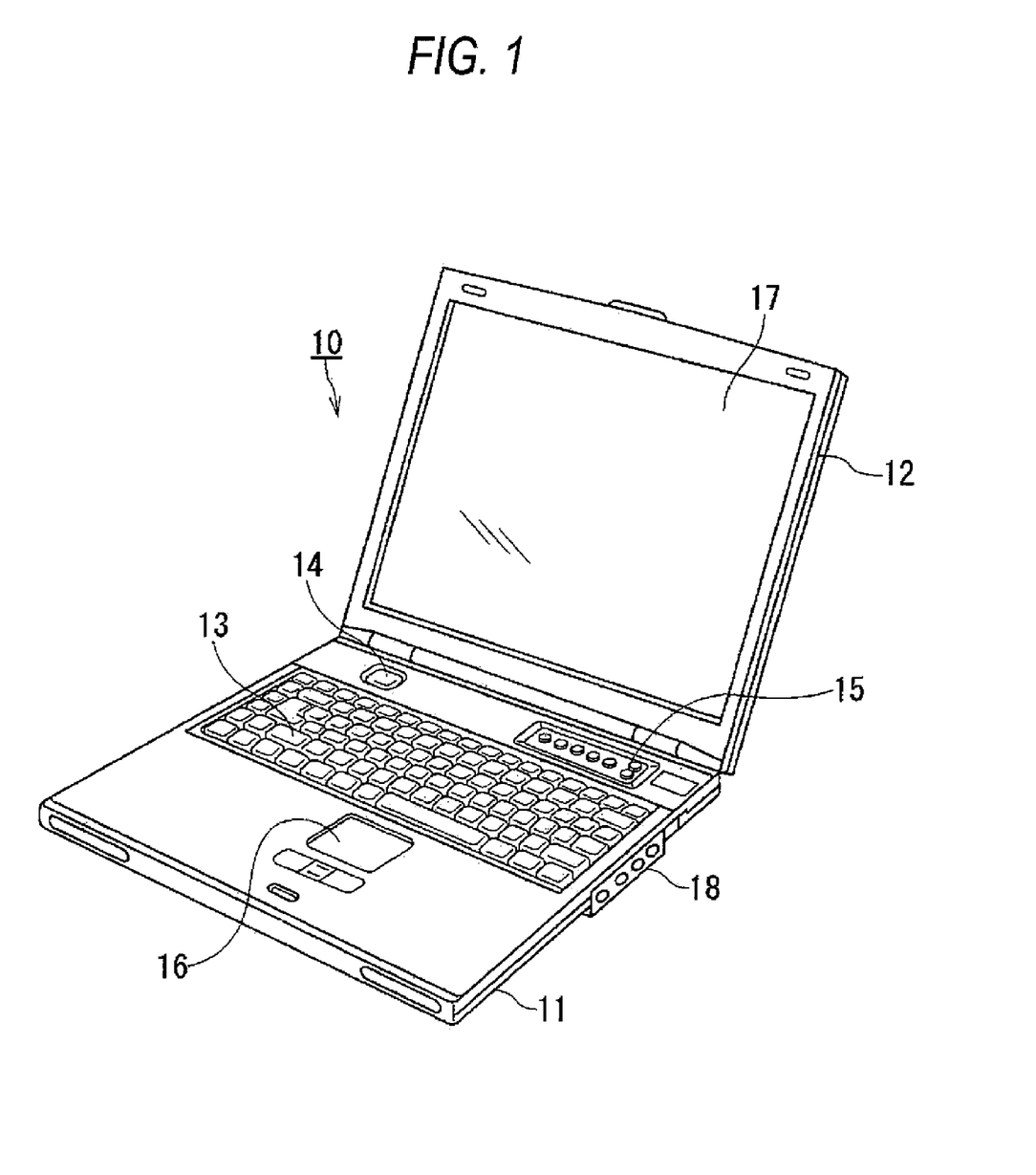
FIG. 1 is an exemplary external perspective view showing an information processing apparatus of an embodiment of the present invention.

FIG. 1 is an exemplary perspective view of a display unit of an information processing apparatus 10 in an opened state. The computer 10 is configured of a computer main unit 11 and a display unit 12. An internal display device 17 configured of; for instance, a Liquid-Crystal Display (LCD), a Cathode-Ray Tube (CRT), a Plasma Display Panel (PDP), an organic Electroluminescence (EL) display, or a Surface-Conduction Electron-Emitter Display (SED) is built in the display unit 12. A display screen of the internal display device 17 is located close to the center of the display unit 12.

The display unit 12 is swingably attached to the computer main unit 11 between an open position and a closed position. The computer main unit 11 has a low-profile box-shaped casing. A keyboard 13, a power button 14 for turning on and off the computer 10, an input operation panel 15, and a touch pad 16 are arranged on an upper face of the casing.

A connector set 18, to which an analogue RGB terminal (a VGA terminal), a Digital Visual Interface (DVI) terminal, and an S terminal used for establishing connection with an external display device are connected, is provided on a side face of the computer main unit 11. The connector set 18 may also be configured so as to be connected by way of an accessory conversion cable without being incorporated into the computer main unit.

A system configuration of the computer 10 will now be described by reference to FIG. 2.

Figure 2:
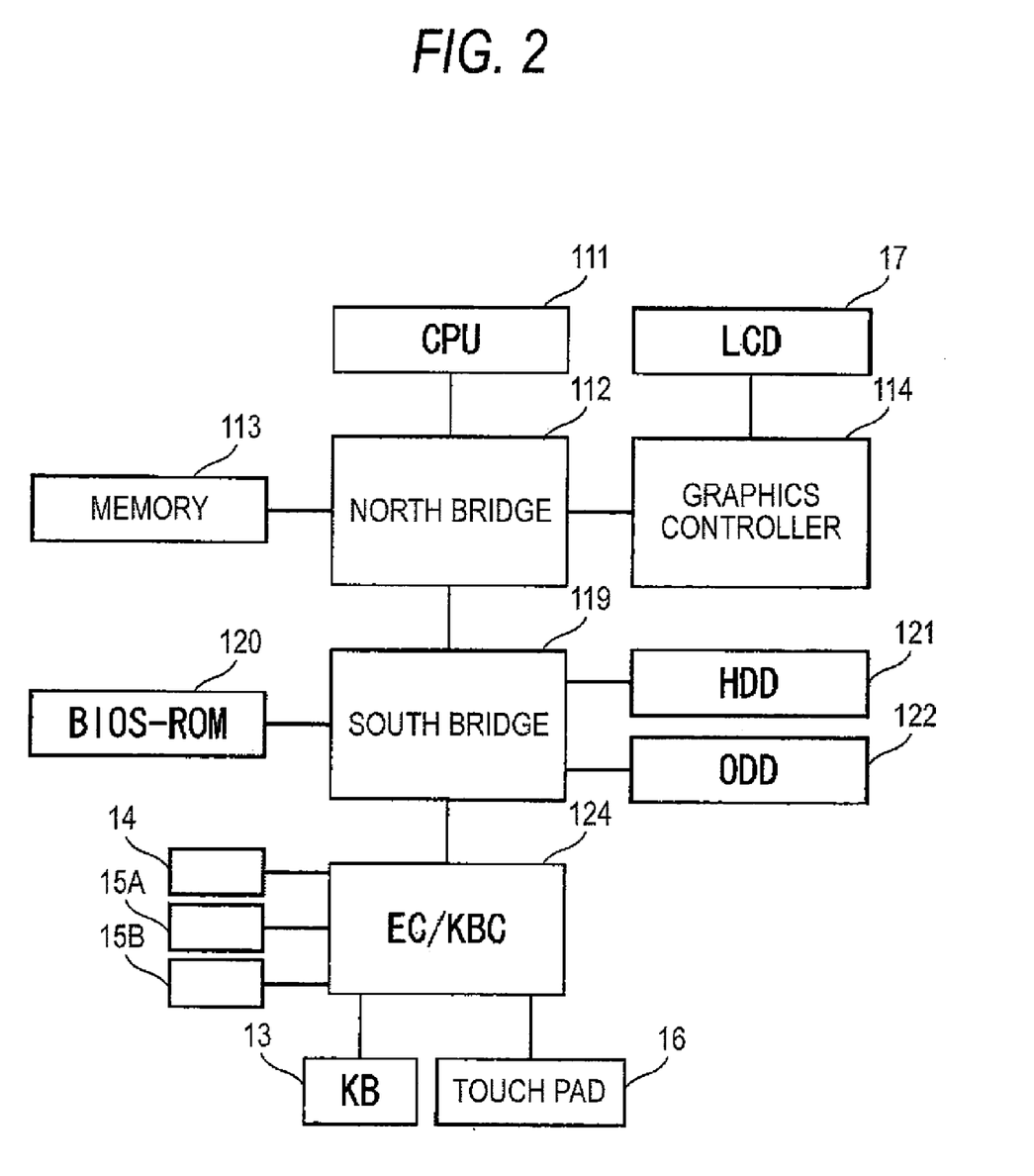
FIG. 2 is an exemplary system block diagram of the information processing apparatus of the embodiment.

As shown in FIG. 2, the computer 10 has a CPU 111, a north bridge 112, memory 113, a graphics controller 114, a south bridge 119, BIOS-ROM 120, a hard disk drive (HDD) 121, an optical disk drive (ODD) 122, an embedded controller/keyboard controller (EC/KBC) IC 124, and the like.

The CPU 111 is a processor provided for controlling operation of the computer 10 and performs an operating system (OS) and various application programs loaded from the hard disk drive (HDD) 121 to the memory 113.

The CPU 111 also performs a Basic Input Output System (system BIOS) stored in the BIOS-ROM 120. The system BIOS is a program that controls hardware.

The north bridge 112 is a bridge device for connecting a local bus of the CPU 111 to the south bridge 119. The north bridge 112 is also equipped with a built-in memory controller for controlling an access to the memory 113. The north bridge 112 also has a function of establishing communication with the graphics controller 114 by way of an Accelerated Graphics Port (AGP) bus, and the like.

The graphic controller 114 is a display controller for controlling the internal display device 17 of the computer 10 and an external display device to be described later. The graphic controller 114 has video memory (VRAM) and generates, from display data written in the video memory (VRAM) by the OS/application program, a video/image signal used for creating a display image to be displayed on the internal display device 17. Further, the graphics controller 114 also has an interface, such as an analogue RGB terminal (a VGA terminal), a DVI terminal, an S terminal, and the like, for outputting a video/image signal to the external display device, such as a CRT and an LCD.

The south bridge 119 controls respective devices connected to a Low Pin Count (LPC) bus. The south bridge 119 also incorporates an Integrated Drive Electronics (IDE) controller for controlling the HDD 121 and the ODD 122. The south bridge 119 has a function for controlling an access to the BIOS-ROM 120 and a function of controlling respective devices connected to a Peripheral Component Interconnection (PCI) bus 20.

The embedded controller/keyboard (EC/KBC) controller IC 124 is a one-chip microcomputer into which an embedded controller for managing power and a keyboard controller for controlling the keyboard (KB) 13, and the touch pad 16 are integrated. The embedded controller/keyboard (EC/KBC) controller IC 124 has a function of turning on or off the power of the computer 10 according to user's operation of the power button 14.

The BIOS-ROM 120 stores a system BIOS. The system BIOS includes a group of programs into which routines that controls hardware are organized.

The information processing apparatus 10 of the present embodiment has a function of simultaneously displaying, on the external display device connected to the apparatus 10 by way of the connector set 18, video/image information identical with video/image information to be displayed on the internal display device 17 (hereinafter called a "clone of a display").

Single video/image information should desirably be displayed in an appropriate display format on the internal display device 17 and an external display device 20 that provide clones of a display. However, an aspect ratio may differ from one device to another; for instance, where the aspect ratio of the internal display device 17 is defined as 4:3 and where the aspect ratio of the external display device 20 is defined as 16:10. In such a case, an undistorted image having a 1:1 aspect ratio of a dot that is the minimum elementary unit of an image can be displayed on the internal display device 17. However, a vertically-elongated image whose dot aspect ratio is laterally extended 1.2 times to a ratio of 1.2:1 is displayed on the external display device 20.

Even when the internal display device 17 and the external display device 20 that provide clones of a display are different from each other in terms of an aspect ratio, the information processing apparatus 10 of the present embodiment can display suitable video/image information.

Figure 3:
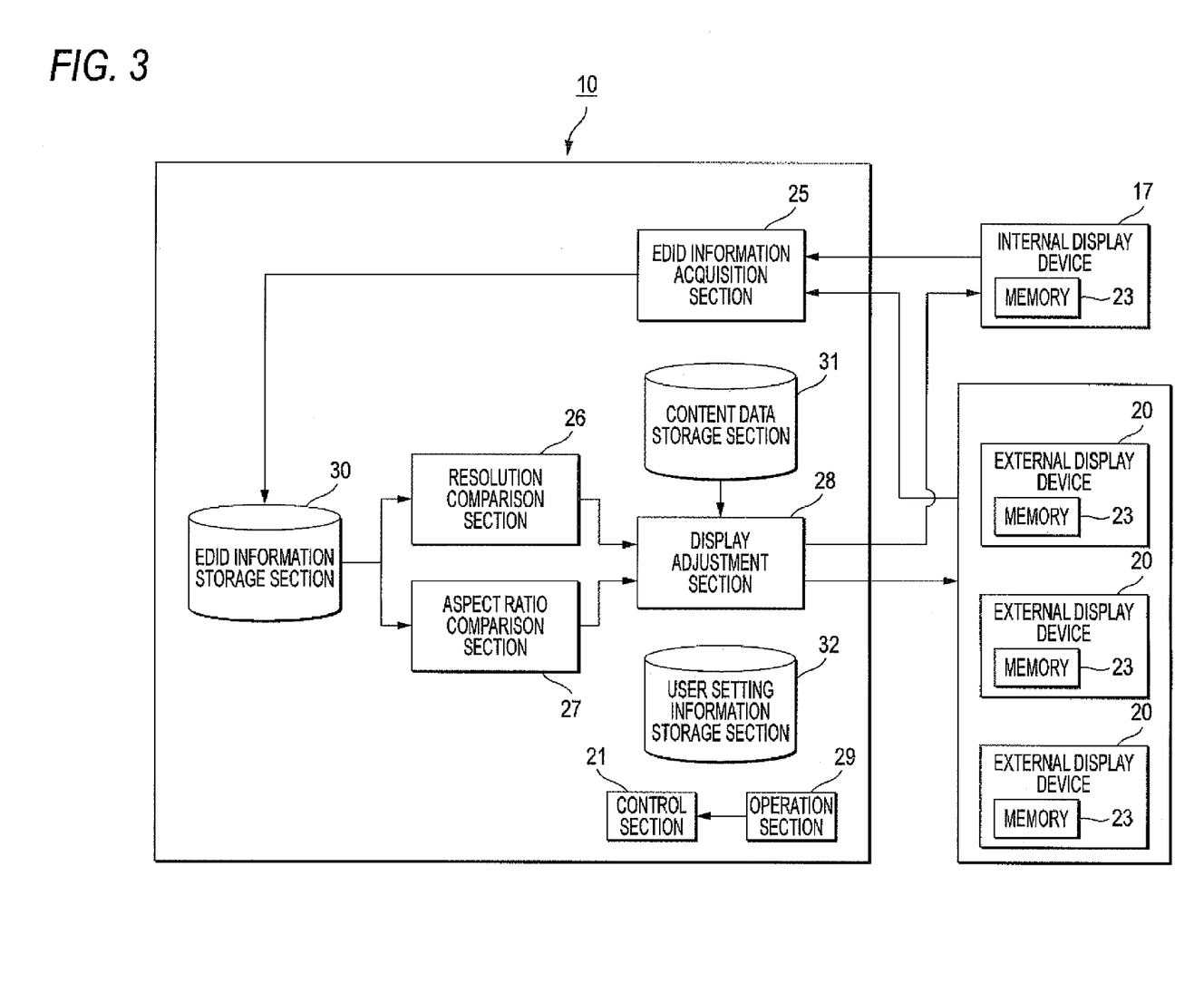
FIG. 3 is an exemplary view showing a functional configuration of the information processing apparatus of the embodiment.

FIG. 3 is a functional block diagram that displays an example functional configuration of the information processing apparatus 10 achieved when the information processing apparatus 10 sets (adjusts) a display format for outputting optimum video/image information in conformance with the external display device 20. The internal display device 17 is actually configured within the information processing apparatus 10 but represented as being located outside, as shown in FIG. 3, for the sake of convenience.

The external display device 20 connected to the information processing apparatus 10 shown in FIG. 3 will now be described.

The external display device 20 corresponds to a personal computer, a television receiver, and a projector and each has a display device built from a CRT, an LCD, a PDP, an organic EL, an SED, or the like.

In the external display device 20, a digital video signal and an analogue video signal are output from the information processing apparatus 10 by way of an interface, such as an analogue RGB, a Digital Visual Interface (DVI), a High-Definition Multimedia Interface (HMDI), and an S terminal.

General aspect ratios for the external display device 20 and the internal display device 17 include various aspect ratios; for instance, a ratio of 4:3, a ratio of 5:4, a ratio of 16:9, and a ratio of 16:10.

Each of the external display device 20 and the internal display device 17 has memory 23 where Extended Display Identification Data (EDID) information are stored. When the external display device 20 and the information processing apparatus 10 are connected to each other by cables (not shown) compatible with the respective display devices, the EDID information stored in the memory are transmitted to the information processing apparatus 10 in conformance with Display Data Channel (DDC) standards to be described later. When the external display device 20 is connected to the information processing apparatus 10 by way of an interface of an S terminal, the EDID information cannot be acquired by use of the DDC from the viewpoint of a configuration, and therefore the memory 23 is not configured in the external display device 20.

Figure 4:
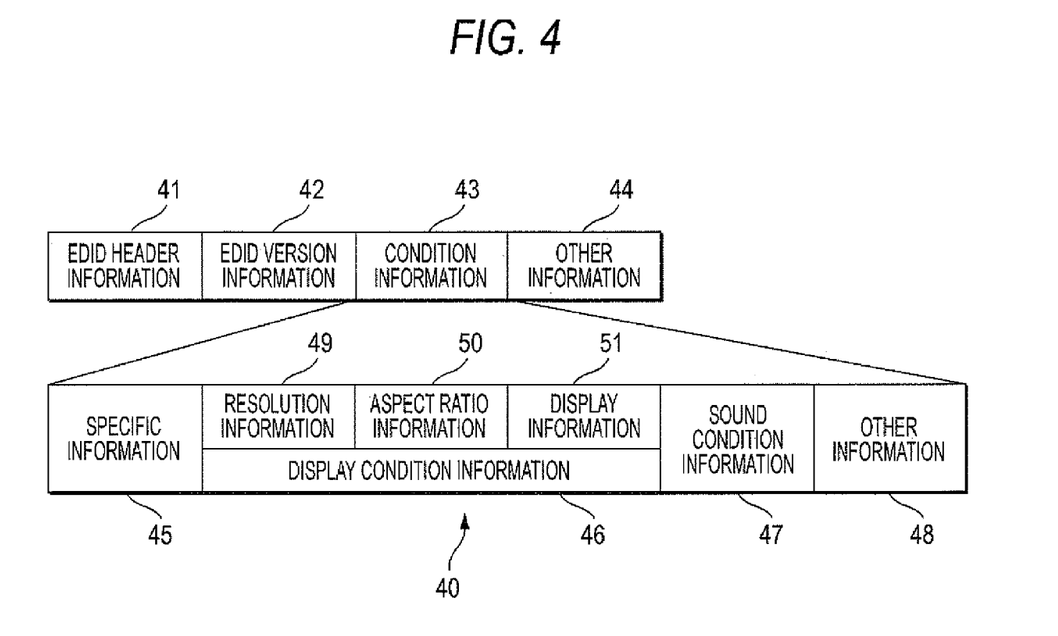
FIG. 4 is an exemplary view showing a data configuration of EDID information transmitted from an external display device to the information processing apparatus.

FIG. 4 is an exemplary view showing a data configuration of the EDID information transmitted from the external display device 20 to the information processing apparatus 10.

The EDID information 40 includes EDID header information 41, EDID version information 42, condition information 43, and other information 44 that is other than these pieces of information.

Of these pieces of information, the condition information 43 includes specific information 45 for specifying a display device, display condition information 46 showing a display condition for the display device, sound condition information 47 showing audio conditions for the display device; and other information 48 that is other than these pieces of information.

The specific information 45 includes; for instance, the name of a manufacturer of a display device, a product code, a serial number, a year and a week of manufacture, predetermined display device designation information, and the like.

The display condition information 46 includes resolution information 49, aspect ratio information 50, and display information 51 and is used as display condition information including a resolution and an aspect ratio employed in the present embodiment.

The resolution information 49 includes; for instance, compatible resolution information including one resolution or more compatible to a display device and optimum resolution information showing an optimum resolution among the resolutions compatible with the display device. The aspect ratio information 50 includes aspect ratio information showing an aspect ratio capable of being displayed on the display device. The display information 51 is information showing another display condition for the display device; namely, display information other than the above-mentioned specific display conditions. The display information 51 includes information according to a display; for example, image display format information corresponding to the display device, image quality information serving as a standard when information is displayed on the display device, and pixel number information corresponding to the display device.

The audio condition information 47 includes; for example, compatible sound condition information showing compatible sound conditions, such as Dolby-compatible digital sound and Digital Theater Systems (DTS)-compatible sound.

In the meantime, the other information 48 of the EDID information 40 includes basic parameters including a definition of a video input, the maximum image size, and a transmission characteristic of a display device; RGB color characteristics of a display device; signal timings including resolution information, frequency information, and aspect ratio information; extension data presence/absence flag showing presence/absence of extension data (an extension) of a display device; a checksum used for detecting an error in data transmission; and the like.

The external display device 20 and the internal display device 17 transmit to the information processing apparatus 10 the EDID information stored in the memory 23 by use of a Display Data Channel (DDC) notification format. The DDC is employed for an unillustrated analogue RGB cable, a DVI cable, and the like, that connect the internal display device 17 to the external display device 20.

The EDID information 40 does not necessarily include all of these pieces of information. The information processing apparatus 10 of the present embodiment is configured such that the apparatus can be implemented even when the EDID information 40 does not include these pieces of information.

For instance, when the external display device 20 is connected to the information processing apparatus 10 by the interface of the S terminal, the EDID information cannot be acquired by use of the DDC from the viewpoint of a configuration. Therefore, information corresponding to the EDID information, such as a resolution and an aspect ratio, may also be acquired from the system BIOS of the BIOS-ROM 120. Likewise, the EDID information in the internal display device 17 may also be acquired from the system BIOS.

When the EDID information 40 cannot be acquired, the display device may also be deemed to be an old display device that does not comply with the EDID information and assume an aspect ratio of 4:3 that has been generally used in the related art.

The information processing apparatus 10 shown in FIG. 3 will now be described.

The information processing apparatus 10 is configured of an EDID information acquisition section 25, a resolution comparison section 26, an aspect ratio comparison section 27, a display adjustment section 28, a control section 21, and an operation section 29. An EDID information storage section 30, a content data storage section 31, and a user setting information storage section 32 are configured as a database.

The control section 21 is implemented by the CPU 111 shown in FIG. 2 and controls respective sections of the information processing apparatus 10. For instance, when supplied with an operation signal to the effect of playing back predetermined content data from the operation section 29, the control section 21 acquires designated content data from the content data storage section 31 in response to the operation signal and supplies the thus-acquired video/image signal to the display adjustment section 28. Signal lines extending from the control section 21 to the respective sections are omitted from FIG. 3.

The operation section 29 is implemented by the keyboard 13, the touch pad 16, and the like, shown in FIG. 1 and supplies an operation signal responsive to user's operation to the control section 21. For instance, when the user performs operation for playing back predetermined content data of the pieces of content data stored in the content data storage section 31, the operation section 29 supplies the control section 21 with an operation signal corresponding to the operation.

When the user sets in advance an aspect ratio of the video/image information to be displayed on the internal display device 17 and the external display device 20 that provide clones of a display, the operation section 29 supplies the control section 21 with an operation signal responsive to the operation. In accordance with the thus-supplied operation signal, the control section 21 stores the settings of the aspect ratio in the user setting information storage section 32.

When the connector set 18 of the information processing apparatus 10 is connected to the external display device 20 by means of cables (not shown), the EDID information acquisition section 25 serving as a display condition information acquisition section acquires the EDID information 40 from the memory 23 of the external display device 20. At the time of acquisition of the EDID information 40, the EDID information acquisition section 25 acquires vertical and horizontal resolution information or size information about the respective display devices and stores the thus-acquired information in the EDID information storage section 30. The resolution information includes optimum resolution information realizing optimum display timing of the display device and compatible resolution information that is a compatible resolution.

The EDID information acquisition section 25 determines an aspect ratio from resolution information or size information about the respective display devices stored in the EDID information storage section 30 and stores the thus-determined aspect ratio into the EDID information storage section 30 as well.

When optimum resolution information showing an optimum resolution of the resolutions corresponding to the display device is included in the acquired EDID information 40, an aspect ratio of the display device is determined based on a ratio of the vertical resolution to the horizontal resolution of the display device.

In contrast, when the optimum resolution information is not included in the EDID information 40 acquired from the display device, an aspect ratio is determined based on the size information included in the EDID information 40. A ratio of 4:3, a ratio of 5:4, a ratio of 16:9, a ratio of 16:10, and the like, are available as example aspect ratios. However, when an aspect ratio is determined based on size information, these general aspect ratios may not apply to the display device. In this case, these general aspect ratios are prepared in advance. When a target aspect ratio vary from any one of the aspect ratios by 5% or less, the display device is stored as having the aspect ratio in the EDID information storage section 30.

In relation to the EDID information 40 about the internal display device 17, the EDID information 40 is not acquired from the memory 23 every time a clone of a display is provided but may also be acquired from the system BIOS of the BIOS-ROM 120. Moreover, when the external display device 20 is connected to the information processing apparatus 10 by the interface of the S terminal, the EDID information may also be acquired from the system BIOS of the BIOS-ROM 120.

When information about the aspect ratio of the display device is included in the EDID information 40, a value of the information may also be stored in the EDID information storage section 30.

The resolution comparison section 26 performs resolution comparison processing for comparing the resolution of the external display device 20 with the resolution of the internal display device 17, both of which provide clones of a display, thereby acquiring resolutions that appropriately display video/image information. The resolution comparison processing is for performing a comparison in connection with a vertical resolution and a horizontal resolution, thereby determining an optimum display resolution which enables all of the display devices to provide a display. After resolution comparison processing, the thus-determined optimum resolution is output to the display adjustment section 28 as a resolution applied to display devices that provide clones of a display.

Resolution comparison processing is performed in accordance with the EDID information 40 about the external display device 20 and the internal display device 17 stored in the EDID information storage section 30. When optimum resolution information is included in the EDID information 40, the optimum resolution is used as a resolution used for comparison by the resolution comparison section 26. When optimum resolution information is not present, a maximum resolution of pieces of compatible resolution information including one or more resolutions is used. The resolution comparison section 26 may also acquire information about a resolution from the system BIOS of the BIOS-ROM 120.

Processing performed by the resolution comparison section 26 will be described in detail later.

The aspect ratio comparison section 27 acquires the aspect ratio of the external display device 20 and the aspect ratio of the internal display device 17 that have been acquired by the EDID information acquisition section 25 and stored in the EDID information storage section 30, thereby performing a comparison as to whether or not the aspect ratios are identical with each other. Results of comparison are output to the display adjustment section 28.

The display adjustment section 28 is implemented by the graphics controller 114 and subjects video/image information to be displayed by the respective display devices to required display adjustment by reference to the results of comparison performed by the resolution comparison section 26 and the aspect ratio comparison section 27. Data to be subjected to display adjustment are supplied from the content data storage section 31.

When the optimum display resolution acquired by the resolution comparison section 26 is the resolution of the internal display device 17, a change is not particularly made to the resolution. However, when the optimum resolution is the resolution of the external display device 20, there is performed processing for changing the resolution of the internal display device 17 to the resolution of the external display device 20 in order to appropriately display the content data stored in the content data storage section 31.

When the respective display devices are equal to each other in terms of an aspect ratio, the video/image information can be displayed at current display timing. Hence, suitable video/image information can be provided in the form of clones. In contrast, when the respective display devices differ from each other in terms of an aspect ratio, video/image information to be displayed is subjected to display adjustment so as to be compatible with the aspect ratios of the display devices.

Processing performed by the display adjustment section 28 will be described in detail later.

When the user sets an arbitrary aspect ratio in a specific display device, the aspect ratio is stored in the user setting information storage section 32 along with information for specifying the display device. Information for specifying a display device to be stored in the user setting information storage section 32 corresponds to; for example, specific information of the EDID information 40.

On the basis of the specific information 45 included in the EDID information 40 acquired by the EDID information acquisition section 25, the control section 21 makes a determination as to whether or not matching specific information 45 is present in the user setting information storage section 32. When the control section 21 determines presence of matching specific information 45, the user setting information stored in the user setting information storage section 32 is output to the display adjustment section 28. The display adjustment section 28 performs display adjustment processing on the basis of the output user setting information in such a way that information is displayed on the display device at the aspect ratio set by the user.

The EDID information storage section 30, the content data storage section 31, and the user setting information storage section 32 are implemented by the HDD 121 shown in FIG. 2 and store various types of data.

Figure 5:
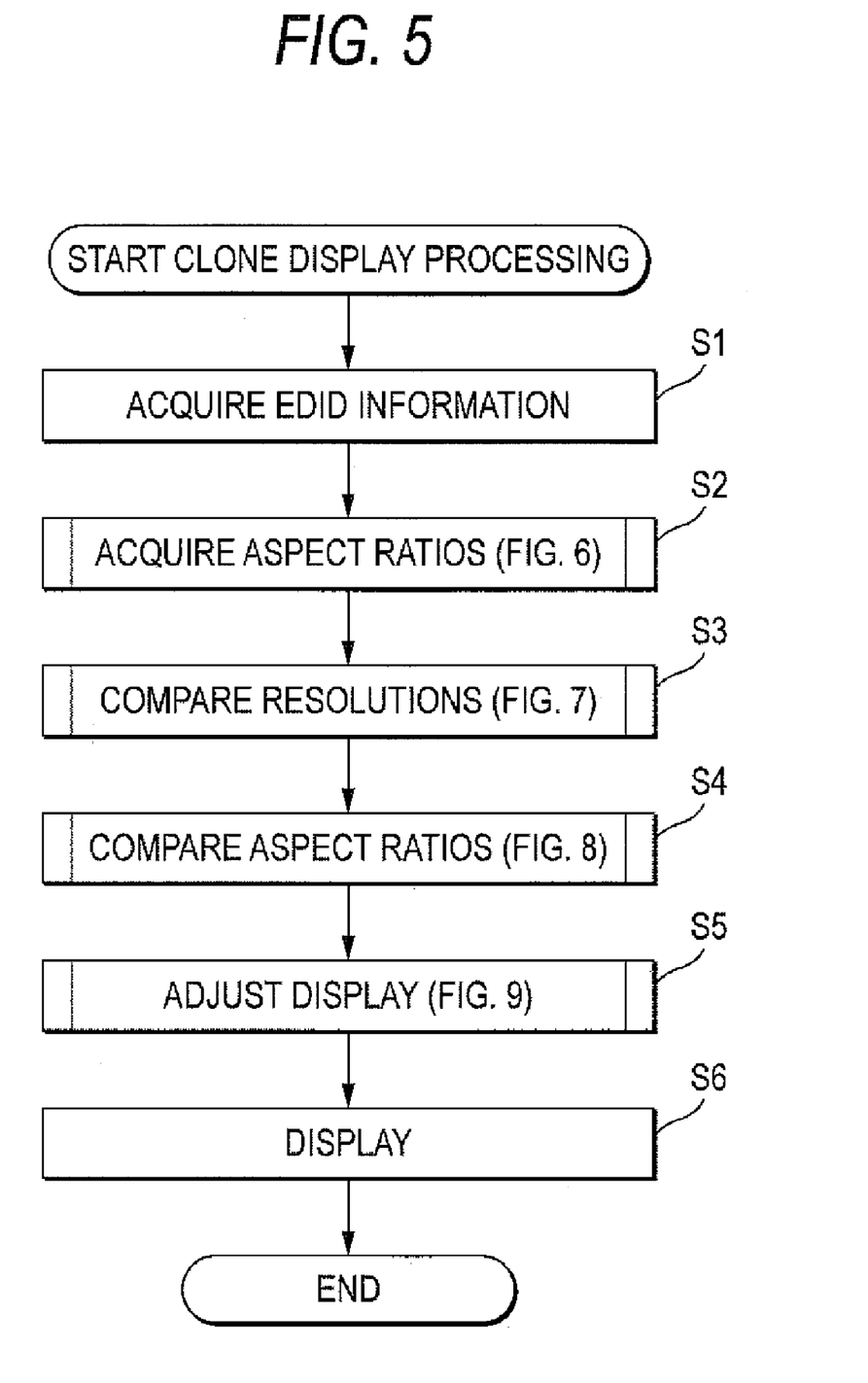
FIG. 5 is an exemplary flowchart for describing clone display processing performed by the information processing apparatus of the embodiment.

Clone display processing performed by the information processing apparatus 10 of the present invention will now be briefly described by reference to a flowchart shown in FIG. 5. Clone display processing shown in FIG. 5 is started when the control section 21 acquires an operation signal for providing clones of a display by way of the operation section 29.

In step S1, the EDID information acquisition section 25 of the information processing apparatus 10 acquires the EDID information 40 from the memory 23 of the external display device 20 and the memory 23 of the internal display device 17.

The EDID information acquisition section 25 acquires the vertical and horizontal resolution information and size information about a display device of the EDID information 40 and stores the thus-acquired information into the EDID information storage section 30. The resolution information includes optimum resolution information for realizing optimum display timing of a display device and compatible resolution information that is a compatible resolution.

The EDID information 40 about the internal display device may also be acquired from the system BIOS of the BIOS-ROM 120. If possible, even size information about the external display device 20 connected to the information processing apparatus 10 by means of an S terminal cable that does not conform to the DDC may also be acquired from the system BIOS.

Figure 6:
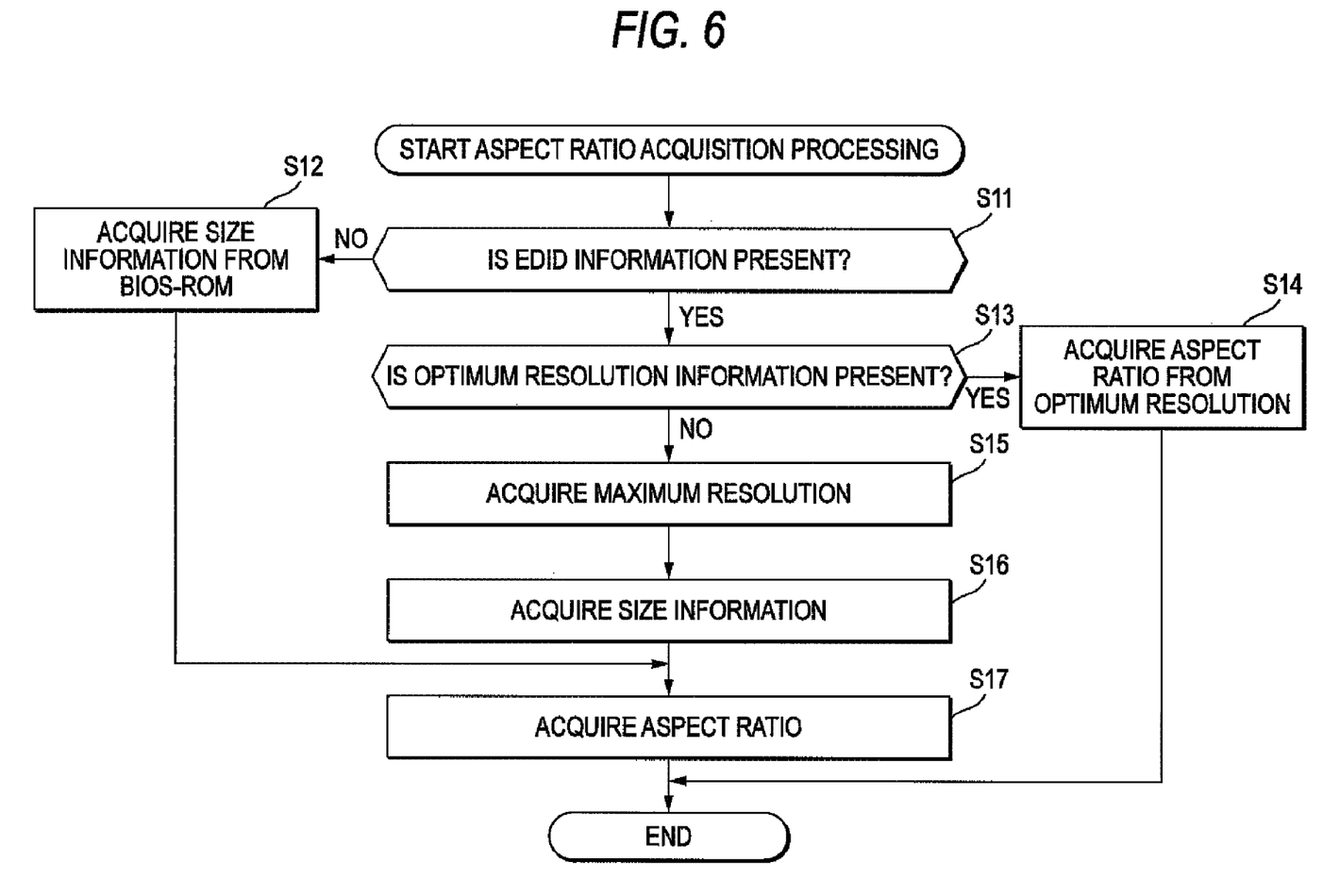
FIG. 6 is an exemplary flowchart for describing aspect ratio acquisition processing performed by an EDID information acquisition section of the information processing apparatus.

In step S2, the EDID information acquisition section 25 performs aspect ratio acquisition processing for acquiring an aspect ratio from the resolution information and size information about the external display device 20 and the internal display device 17 stored in the EDID information storage section 30 (FIG. 6). The acquired aspect ratio is stored in the EDID information storage section 30. The aspect ratio acquisition processing is performed through use of the vertical and horizontal resolution and the size information stored in the EDID information storage section 30.

Figure 7:
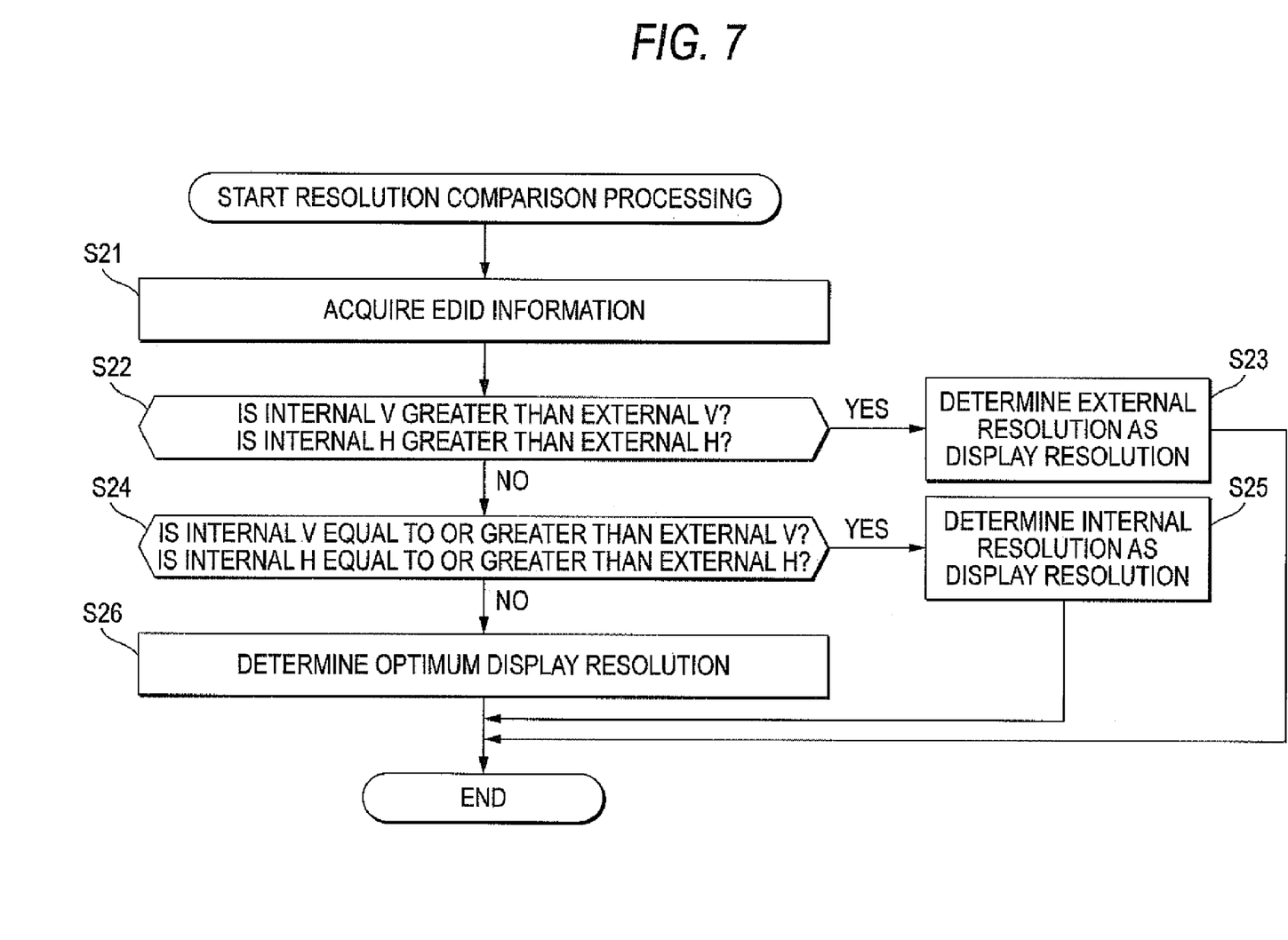
FIG. 7 is an exemplary flowchart for describing resolution comparison processing performed by a resolution comparison section of the information processing apparatus.

In step S3, the resolution comparison section 26 performs processing for comparing the resolutions of the respective display devices stored in the EDID information storage section 30 (FIG. 7). Comparison of the resolutions is performed for each vertical resolution and each horizontal resolution, thereby acquiring an optimum resolution compatible with all of the display devices that provide clones of a display. Comparison results are output to the display adjustment section 28.

Figure 8:
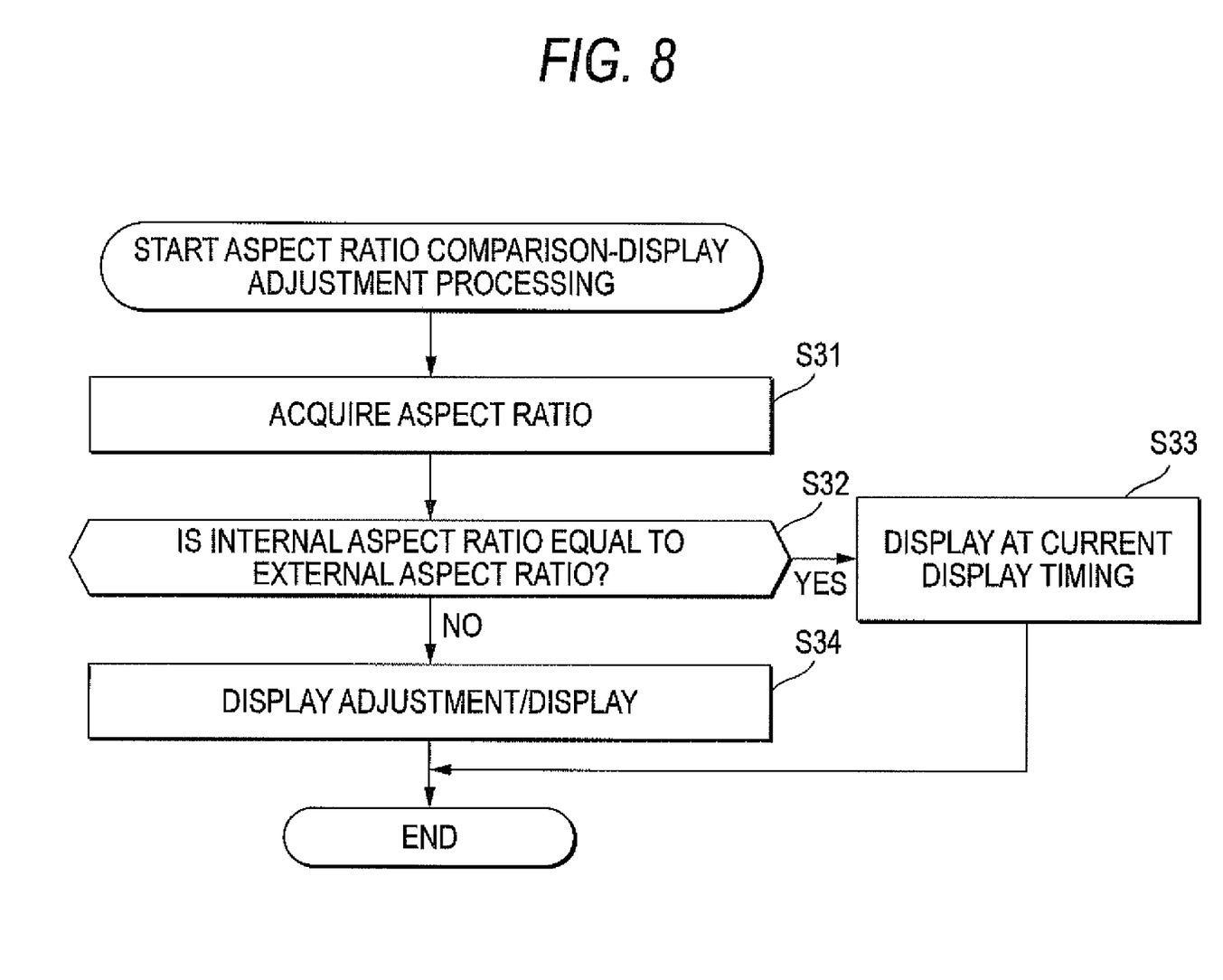
FIG. 8 is an exemplary flowchart for describing aspect ratio comparison processing performed by an aspect ratio comparison section and display adjustment processing performed by a display adjustment section of the information processing apparatus.

In step S4, the aspect ratio comparison section 27 performs aspect ratio comparison processing for making a comparison in connection with differences among the aspect ratios of the respective display devices stored in the EDID information storage section 30 (FIG. 8). Comparison results are output to the display adjustment section 28.

In step S5, the display adjustment section 28 performs display adjustment processing, on the basis of the comparison results output from the resolution comparison section 26 and the aspect ratio comparison section, in such a way that video/image information is appropriately displayed on the respective display devices (FIG. 8), and clone display processing is terminated.

Next, aspect ratio acquisition processing step S2 pertaining to clone display processing will be described in detail. FIG. 6 is an exemplary flowchart for describing aspect ratio acquisition processing performed by the EDID information acquisition section 25 of the information processing apparatus 10.

In step S11, the EDID information acquisition section 25 determines presence or absence of the EDID information 40 about the respective connected display devices. When the EDID information 40 cannot be acquired, the EDID information acquisition section 25 acquires size information about the display device from the system ROM of the BIOS-ROM 120 in step S12 if possible. Even in relation to the internal display device 17, size information can be acquired from the BIOS-ROM 120 in the same fashion.

In step S13, the EDID information acquisition section 25 determines presence or absence of optimum resolution information in the EDID information 40. The optimum resolution information relates to a resolution, among the resolutions, that enables implementation of optimum display timing compatible with a display device.

When the EDID information acquisition section 25 determines that optimum resolution information is present, an aspect ratio is acquired from the optimum resolution information in step S14. Since the display device is built from dots having an aspect ratio of 1:1, the aspect ratio is determined based on a ratio of vertical resolution to horizontal resolution. The thus-acquired aspect ratio is stored in the EDID information storage section 30, and aspect ratio acquisition processing is completed.

In the meantime, when optimum resolution information is determined not to be present, in step S15 the EDID information acquisition section 25 acquires, from compatible resolutions including one resolution or more compatible with a display device, the maximum resolution from the EDID information 40 stored in the EDID information storage section 30 and stores the thus-acquired information in the EDID information storage section 30.

In step S16, the EDID information acquisition section 25 acquires size information about a display device (e.g., an inch).

In step S17, the EDID information acquisition section 25 determines an aspect ratio of a display device from size information about a display device acquired in size information acquisition steps S12 and S16. When the aspect ratio of the display device not having optimum resolution information is determined from the vertical and horizontal resolutions, an appropriate aspect ratio cannot be determined. Therefore, the EDID information acquisition section 25 acquires an aspect ratio of a display device from a ratio of a horizontal screen size to a vertical screen size. The thus-acquired aspect ratio is stored in the EDID information storage section 30, and aspect ratio acquisition processing is completed.

The aspect ratio determined from the size information may include certain amounts of errors. In this case, when a difference between a common aspect ratio; for instance, a ratio of 4:3, a ratio of 5:4, a ratio of 16:9, and a ratio of 16:10, and the acquired aspect ratio is 5% or less, the display device is stored as having any one of the aspect ratios in the EDID information storage section 30.

When the EDID information 40 cannot be acquired, the display device is deemed to be an old display device that is incompatible with the EDID information and that has an aspect ratio of 4:3 generally used in the related art.

When information about an aspect ratio is included in the EDID information 40, the value may also be stored in the EDID information storage section 30.

Next, resolution comparison step S3 pertaining to clone display processing will be described in detail. FIG. 7 is an exemplary flowchart for describing resolution comparison processing performed by the resolution comparison section 26 of the information processing apparatus 10.

In step S21, the resolution comparison section 26 acquires, from the EDID information storage section 30, the resolution of the external display device 20 and the internal display device 17 that provide clones of a display. When optimum resolution information is included in the EDID information 40, optimum resolution is acquired as a resolution. When optimum resolution information is not present, the maximum resolution of compatible resolution information including one resolution or more is acquired.

In step S22, the resolution comparison section 26 compares a vertical resolution (internal V) of the internal display device 17 with a vertical resolution (external V) of the external display device 20. Likewise, the resolution comparison section 26 compares a horizontal resolution (internal H) of the internal display device 17 with a horizontal resolution (external H) of the external display device 20.

When determined that the vertical and horizontal resolutions of the internal display device 17 are greater than the vertical and horizontal resolutions of the external display device 20, the resolution comparison section 26 determines the resolution of the external display device 20 having the smaller vertical and horizontal resolutions as a display resolution that enable appropriate provision of information on the respective display devices and outputs the resolution to the display adjustment section 28 (step S23) This applies to; for instance, a case where the resolution of the internal display device 17 is 1680 pixels high×1050 pixels wide and where the resolution of the external display device 20 is 1024 pixels high×768 pixels wide.

When determined, in step S24, that the vertical and horizontal resolutions of the internal display device 17 are smaller than or equal to the vertical and horizontal resolutions of the external display device 20, the resolution comparison section 26 determines the resolution of the internal display device 17 having the smaller vertical and horizontal resolutions as a display resolution that enable the respective display devices to provide a display appropriately and outputs the thus-determined resolution to the display adjustment section 28 (step S25).

When the display device having both a large vertical resolution and a large horizontal resolution is not present as in comparison steps S22 and S24; for instance, when the resolution of the internal display device 17 is 1680 pixels high× 1050 pixels wide and when the resolution of the external display device 20 is 1600 pixels high×1200 pixels wide, the resolution of only one of the display devices cannot be unconditionally determined to be an appropriate display resolution.

In this case, a resolution including a vertical resolution of 1600 pixels or less and a horizontal resolution of 1050 pixels or less; for instance, a resolution having 1400 pixels high× 1050 pixels wide, is determined to be an appropriate display resolution, and the thus-determined resolution is output to the display adjustment section 28. Thus, resolution comparison processing is completed.

Aspect ratio comparison step S4 and display adjustment/ display step S5 pertaining to clone display processing will now be described. FIG. 8 is an exemplary flowchart for describing aspect ratio comparison processing performed by the aspect ratio comparison section 27 of the information processing apparatus 10 and display adjustment processing performed by the display adjustment section 28. Display adjustment processing performed by the display adjustment section 28 is carried out in accordance with comparison results output from the resolution comparison section 26 and the aspect ratio comparison section 27.

In step S31, the aspect ratio comparison section 27 acquires aspect ratios of the external display device 20 and the internal display device 17, which provide clones of a display, from the EDID information storage section 30.

In step S32, the aspect ratio comparison section 27 compares the thus-acquired aspect ratios of the respective display devices. When the aspect ratio of the external display device 20 and the aspect ratio of the internal display device 17 are equal to each other, the display adjustment section 28 makes a change to a predetermined display resolution or maintains the display resolution in step S33 on the basis of the comparison result output from the resolution comparison section 26 during resolution comparison processing shown in FIG. 7 and subsequently provides a display at the current display timing of the external display device 20 and the current display timing of the internal display device 17.

When the aspect ratio of the internal display device 17 and the aspect ratio of the external display device 20 are different from each other, the display adjustment section 28 changes or maintains the aspect ratio of the internal display device 17 and the aspect ratio of the external display device 20 to be a predetermined display resolution in step S34 in accordance with a comparison result output from the resolution comparison section 26 during resolution comparison processing shown in FIG. 7. And then the display adjustment section 28 performs display adjustment corresponding to the aspect ratio of the external display device 20 or the aspect ratio of the internal display device 17. The display device whose resolution is changed is subjected to display adjustment corresponding to the aspect ratio, thereby adding blanks to the upper and lower sides or the right and left sides of the display device. Thus, display timing of video/image information is adjusted.

Figure 9A:
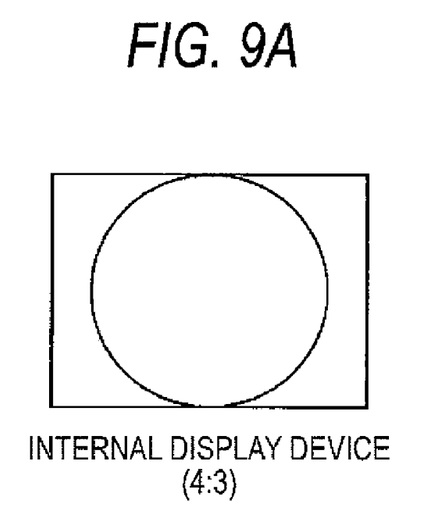
FIGS. 9A to 9D are exemplary view showing display adjustment performed when a resolution of an internal display device having a small display resolution is applied as a display resolution to respective display devices.
Figure 9B:
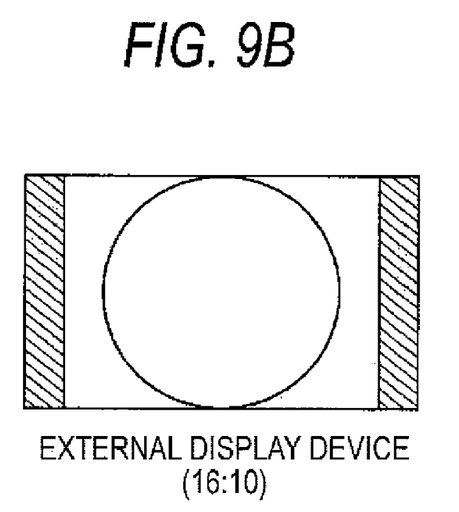

FIGS. 9A to 9D show example display adjustment performed when the resolution of the internal display device 17 having small display resolution is applied as appropriate display resolution to respective display devices. Specifically, the drawing shows an example where the external display device 20 whose resolution has been changed is subjected to display adjustment corresponding to an aspect ratio. FIG. 9A shows example display adjustment of the internal display device 17 configured to have a 4:3 aspect ratio, and FIG. 9B shows example display adjustment of the external display device 20 configured to have a 16:1 aspect ratio.

In this case, as shown in FIG. 9B, the resolution of the external display device 20 is changed to the resolution of the internal display device 17 in accordance with a comparison result output from the resolution comparison section 26. Further, equal blanks are added to the right and left sides of the external display device 20 in such a way that video/image information comes to the center of the display device, so that the information can be displayed at optimum display timing while the aspect ratios of the respective display devices are maintained.

Figure 9C:
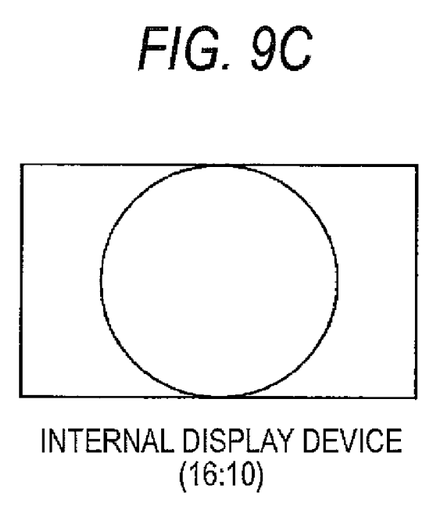
Figure 9D:
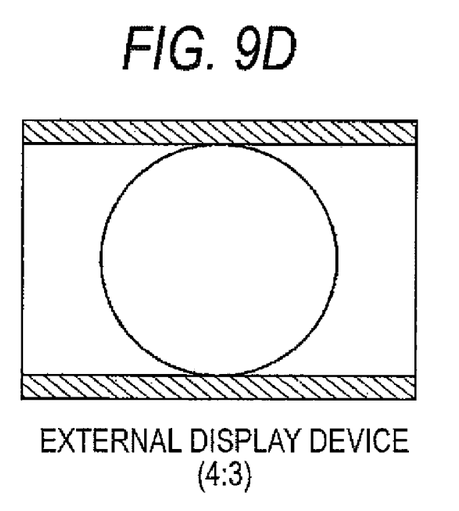

FIG. 9C shows example display adjustment of the internal display device 17 configured to have an aspect ratio of 16:10; and FIG. 9D shows example display adjustment of the external display device 20 configured to have an aspect ratio of 4:3. In this case, as shown in FIG. 9D, the resolution of the external display device 20 is changed to the resolution of the internal display device 17 in accordance with a comparison result output from the resolution comparison section 26. Further, equal blanks are added to the up and lower sides of the external display device 20 in such a way that video/image information is displayed at the center of the display device, thereby maintaining aspect ratios of the respective display devices.

Figure 10A:
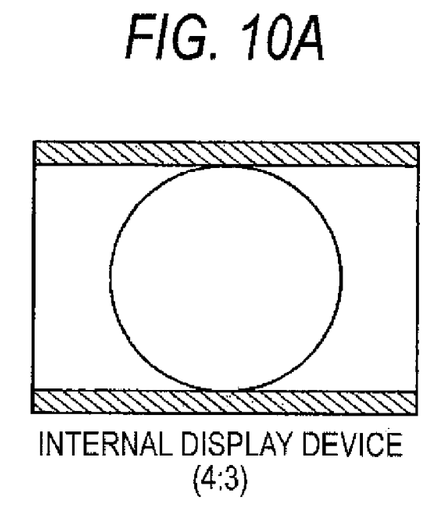
FIGS. 10A to 10D are exemplary view showing display adjustment performed when a resolution of an external display device having a small display resolution is applied as a display resolution to the respective display devices.
Figure 10B:
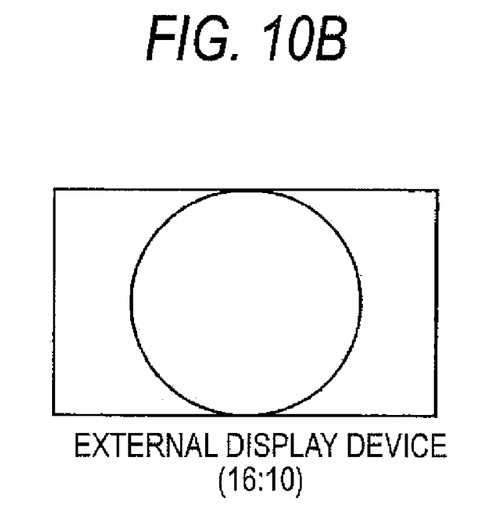

FIGS. 10A to 10D show example display adjustment performed when the resolution of the external display device 20 having a small display resolution is applied, as a display resolution, to respective display devices. Specifically, the drawing shows an example where the internal display device 17 whose resolution has been changed is subjected to display adjustment corresponding to an aspect ratio. FIG. 10A shows example display adjustment of the internal display device 17 configured to have a 4:3 aspect ratio, and FIG. 10B shows example display adjustment of the external display device 20 configured to have a 16:10 aspect ratio.

In this case, as shown FIG. 10A, the resolution of the internal display device 17 is changed to the resolution of the external display device 20 in accordance with a comparison result output from the resolution comparison section 26. Further, equal blanks are added to the upper and lower sides of the internal display device 17 in such a way that video/image information comes to the center of the display device, so that the information can be displayed at optimum display timing while the aspect ratios of the respective display devices are maintained.

Figure 10C:
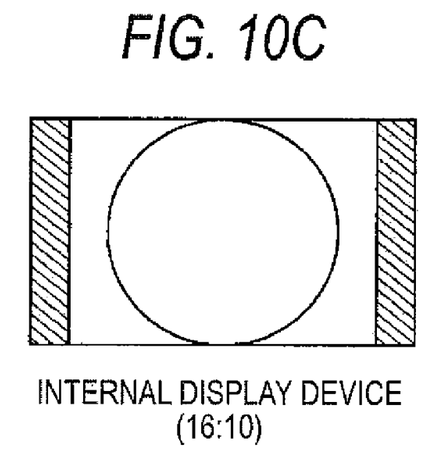
Figure 10D:
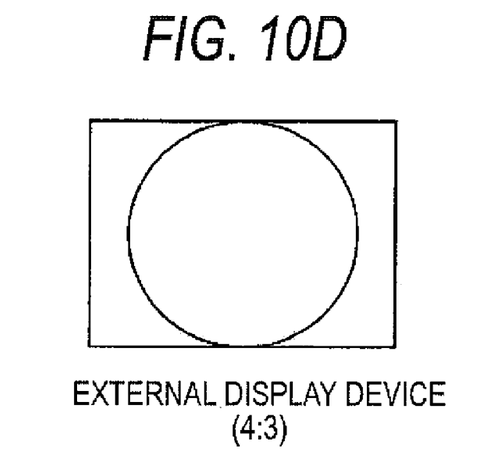

FIG. 10C shows example display adjustment of the internal display device 17 configured to have an aspect ratio of 16:10; and FIG. 10D shows example display adjustment of the external display device 20 configured to have an aspect ratio of 4:3. In this case, as shown in FIG. 10C, the resolution of the internal display device 17 is changed to the resolution of the external display device 20 in accordance with a comparison result output from the resolution comparison section 26. Further, equal blanks are added to the right and left sides of the external display device 20 in such a way that video/image information is displayed at the center of the display device, thereby maintaining aspect ratios of the respective display devices.

When both the resolution of the internal display device 17 and the resolution of the external display device 20 are changed and when the internal display device and the external display device differ from each other in terms of an aspect ratio, blanks are added to the respective display devices in such a way that video-image information is displayed at the center of the display device.

According to the information processing apparatus, single video/image information (clones of a display) is simultaneously provided on the information processing apparatus serving as the internal display device and the external display device connected thereto, resolutions of the respective display devices are compared with each other, and a resolution of smaller value is applied as a display resolution that can be applied to all of the display devices, whereby all of the display devices can appropriately display video/image information.

Further, aspect ratios of the respective display devices are compared with each other. When the aspect ratios differ from each other, blanks are added, thereby adjusting display timing. Thus, suitable video/image information can be displayed without making a change to the original aspect ratios of the respective display devices.

Thereby, suitable video/image information can be displayed without involvement of vertical or horizontal extension, which would otherwise arise as in a related-art clone display when aspect ratios of display devices differ from each other.

The external display device that provides a clone of a display may also be two or more external display devices.

A series of processing described in connection with the embodiment of the present invention can also be performed by software or hardware.

Moreover, although in the present embodiment steps of the flowchart show example processing performed in time sequence along the described order, processing does not always need to be performed in the time sequence, and processing performed in parallel or individually is also included in the embodiment.

What is claimed is:

1. An information processing apparatus having an internal display device that displays video/image information and an output terminal for connection with at least one external display device or more, comprising:
 a display condition information acquisition section that respectively acquires display condition information including a resolution and an aspect ratio from EDID information stored in the internal display device and the external display device, wherein:
  when an optimum resolution information that is most appropriate resolution from among resolutions is included in the EDID information, the display condition information acquisition section acquires the aspect ratio from a ratio of a vertical resolution to a horizontal resolution in the optimum resolution; and,
  when the optimum resolution information is not present, the display condition information acquisition section acquires the aspect ratio from sizes of the internal display device and the external display device included in the EDID information;
 a resolution comparison section that compares the resolutions of the internal display device and the external display device and acquires a display resolution at which the video/image information is displayed;
 an aspect ratio comparison section that compares the aspect ratios of the internal display device and the external display device acquired by the display condition information acquisition section and acquires information about differences among the aspect ratios; and
 a display adjustment section that changes the resolutions of the internal display device and the external display device to the display resolution based on the display resolution acquired by the resolution comparison section and that further adjusts, when the aspect ratios of the internal display device and the external display device differ, display timings of the internal display device and the external display device whose resolution have been changed, based on information about the differences among the aspect ratios acquired by the aspect ratio comparison section.

2. The information processing apparatus according to claim 1, wherein, when adjusting display timings of the internal display device and the external display device whose resolution have been changed, the display adjustment section adjusts the display timings by adding blanks to upper and lower sides or right and left sides.

3. The information processing apparatus according to claim 1, wherein the display adjustment section adjusts the display timings in order to display at a preset aspect ratio.

* * * * *